United States Patent
Stone et al.

(10) Patent No.: US 8,166,499 B2
(45) Date of Patent: Apr. 24, 2012

(54) METHOD, APPARATUS AND SET-TOP DEVICE FOR TRANSMITTING CONTENT TO A RECEIVER

(75) Inventors: Christopher J. Stone, Newtown, PA (US); Mathew Piacentino, Harleysville, PA (US); Robert A. Van Wagenen, Warrington, PA (US)

(73) Assignee: General Instrument Corporation, Horsham, PA (US)

( * ) Notice: Subject to any disclaimer, the term of this patent is extended or adjusted under 35 U.S.C. 154(b) by 1195 days.

(21) Appl. No.: 10/926,706

(22) Filed: Aug. 26, 2004

(65) Prior Publication Data

US 2005/0066356 A1    Mar. 24, 2005

Related U.S. Application Data

(60) Provisional application No. 60/503,859, filed on Sep. 18, 2003.

(51) Int. Cl.
  *H04N 7/167*    (2011.01)
  *H04N 7/16*    (2011.01)
  *H04N 5/46*    (2006.01)

(52) U.S. Cl. .............................. 725/31; 725/25; 348/556

(58) Field of Classification Search .................... 725/25, 725/31, 80, 78, 131–133, 139–141, 151–153; 726/2; 348/555, 556
See application file for complete search history.

(56) References Cited

U.S. PATENT DOCUMENTS

| | | | | |
|---|---|---|---|---|
| 5,461,427 A * | 10/1995 | Duffield et al. | ............... | 348/555 |
| 6,724,948 B1 * | 4/2004 | Lippincott | .................... | 382/298 |
| 6,763,019 B2 * | 7/2004 | Mehta et al. | ................... | 370/352 |
| 6,950,520 B1 * | 9/2005 | Ryan et al. | ..................... | 380/200 |
| 7,131,004 B1 * | 10/2006 | Lyle | ............................... | 713/169 |
| 7,221,853 B1 * | 5/2007 | Shima et al. | .................. | 386/231 |
| 2003/0145336 A1 * | 7/2003 | Matsuzaki et al. | ............ | 725/136 |

OTHER PUBLICATIONS

"High-bandwidth Digital Content Protection System"; Revision 1.091; Apr. 22, 2003.
"High-bandwidth Digital Content Protection System," Rev. 1.0, Digital Content Protection, LLC, Feb. 17, 2000, pp. 1-60.
"Digital Visual Interface (DVI)", Revision 1.0, Digital Display Working Group, Apr. 2, 1999, pp. 1-76.

* cited by examiner

*Primary Examiner* — Joseph P Hirl
*Assistant Examiner* — Hyun Hong

(57) ABSTRACT

A method for transmitting content (12) via a digital video interface (15) using a high-bandwidth digital content protection system (50). The content (12) has a first format in a first state, a second format in a second state, and vertical blanking intervals associated therewith. In the first state, the method includes: authenticating (302) that the receiver (25) is licensed to receive the content, signaling (304) that the content will be encrypted, and transmitting (306) the encrypted content in the first format. A transition of the content from the first format to the second format is detected (308), and the encrypted content continues (310) to be transmitted in the first format. In the second state, the method includes: signaling (312) that the content will be unencrypted, adjusting (314) the transmitter to transmit in the second format, waiting (316) for the receiver to identify a vertical blanking interval, signaling (318) that the content will be re-encrypted, and transmitting (320) the re-encrypted content in the second format.

14 Claims, 5 Drawing Sheets

METHOD, APPARATUS AND SET-TOP DEVICE FOR TRANSMITTING CONTENT TO A RECEIVER

STATEMENT OF RELATED APPLICATION

This application claims the benefit of provisional application No. 60/503,859, filed Sep. 18, 2003.

FIELD

Aspects of this invention relate generally to video signal processing, and, more particularly, to a method, apparatus, and set-top device for transmitting content to a receiver via a digital video interface using a high-bandwidth digital content protection system.

BACKGROUND

Program providers such as television networks and stations, studios, Internet broadcasters and service providers, cable operators, satellite operators, and the like, deliver video content to consumers via digital signals. Devices and signals involved in the delivery of video content to consumers may comply with various industry specifications, or standards, which have been promulgated by groups desiring, among other things, to ensure interoperability between systems and devices that deliver the video content, and to ensure that the video content is not copied or otherwise misused.

The Digital Display Working Group ("DDWG"), for example, has published a document entitled Digital Visual Interface, Revision 1.0 (the "DVI Specification"), which sets forth an industry standard for a physical digital visual interface ("DVI"), and a protocol for electrical signaling thereon, between a source device (such as a PC, a set-top box, a DVD player, or a digital VCR) and a display device (such as a television monitor, a computer monitor, or a projector). The DVI Specification is hereby incorporated by reference in its entirety for all purposes, as if set forth in full herein.

Digital Content Protection, LLC developed the High-bandwidth Digital Content Protection System (the "HDCP System"), which provides protection against copying for audio-visual content (as defined in the United States Copyright Act as in effect on Jan. 1, 1978) transmitted over certain high-bandwidth interfaces, such as DVIs, and has promulgated a standard describing the HDCP System, entitled High-bandwidth Digital Content Protection System, Revision 1.00 (the "HDCP Specification"). The HDCP Specification is also hereby incorporated by reference in its entirety for all purposes, as if set forth in full herein.

One element of the HDCP System is an authentication protocol, through which HDCP/DVI-enabled source devices (referred to as HDCP transmitters) verify that HDCP/DVI-enabled display devices (referred to as HDCP receivers) are licensed to receive HDCP content. A second element of the HDCP System is the transmission of encrypted content between an HDCP transmitter and an HDCP receiver based on shared secrets established during the authentication protocol.

One method the HDCP System uses to identify unauthorized or compromised devices is to require that both the HDCP transmitter and the HDCP receiver periodically calculate certain authentication values when encrypted content is being transmitted-the authentication values must correlate and be received in a timely manner to maintain communication between the HDCP transmitter and the HDCP receiver. When authenticated communication between the HDCP transmitter and HDCP receiver is lost, a period of "snow" generally appears on the HDCP receiver.

One problem not adequately addressed by the HDCP Specification, however, is that the loss of authenticated communication between HDCP transmitters and HDCP receivers can occur merely when the transmitted content changes formats, because different formats may have different timing parameters. For example, timing parameters such as refresh rates (the number of times per second an HDCP receiver paints a screen with a video signal) affect the timing of vertical blanking intervals (the short spans of time between screen paintings), which are used to calculate and/or correlate certain authentication values. When a new format has a slower refresh rate than the original format, for example, the HDCP transmitter and HDCP receiver may lose authenticated communication, and snow may appear on the HDCP receiver. Frequent disruption in video reception may cause consumers to become dissatisfied with the performance of their source devices, display devices, and/or content providers.

There are, therefore, needs for methods and apparatuses for transmitting content to HDCP receivers that allow for content formats to change without disrupting video reception by the HDCP receivers.

SUMMARY

In accordance with one aspect of the present invention, a method for transmitting content to a receiver via a digital video interface using a high-bandwidth digital content protection ("HDCP") system is provided. The content has a first format in a first state, a second format in a second state, and has vertical blanking intervals associated therewith. The method includes: authenticating that the receiver is licensed to receive the content; in the first state, signaling that the content will be encrypted; in the first state, transmitting the encrypted content in the first format; detecting a transition of the content from the first format to the second format; after detecting the transition, continuing to transmit the encrypted content in the first format; in the second state, signaling that the content will be unencrypted; in the second state, adjusting the transmitter to transmit the content in the second format; in the second state, waiting for the receiver to identify a vertical blanking interval; in the second state, after the step of adjusting the transmitter, signaling that the content will be re-encrypted; and in the second state, transmitting the re-encrypted content in the second format.

In the second state, after the step of adjusting the transmitter, there may be included a further step of waiting a predetermined period of time, of at least about two seconds. The step of waiting for the receiver to identify the vertical blanking interval may further include receiving an indication that the receiver identified a vertical blanking interval; and verifying receipt of the indication that the receiver identified the vertical blanking interval. The identified vertical blanking interval may be associated with a refresh rate of the first format or the second format. The step of verifying receipt of the indication that the receiver identified the vertical blanking interval may occur prior to the step of signaling that the content will be unencrypted, and/or after the step of adjusting the transmitter to transmit the content in the second format. The step of signaling that the content will be unencrypted may occur during a first vertical blanking interval (associated with the refresh rate of the first format or the second format) after detecting the transition. The step of detecting the change from the first format to the second format may include detecting a change of a copy control information ("CCI") flag.

According to another aspect of the present invention, a computer-readable medium is encoded with a computer program which, when loaded into a processor, implements the foregoing method.

According to a further aspect of the present invention, an apparatus for transmitting content to a receiver via a digital video interface using a high-bandwidth digital content protection ("HDCP") system, the content having a first format in a first state, the content having a second format in a second state, and the content having vertical blanking intervals associated therewith, includes a computer-readable storage medium; and a processor responsive to the computer-readable storage medium and to a computer program. The computer program, when loaded into the processor, is operative to perform a method including: authenticating that the receiver is licensed to receive the content; in the first state, signaling that the content will be encrypted; in the first state, transmitting the encrypted content in the first format; detecting a transition of the content from the first format to the second format; after detecting the transition, continuing to transmit the encrypted content in the first format; in the second state, signaling that the content will be unencrypted; in the second state, adjusting the transmitter to transmit the content in the second format; in the second state, waiting for the receiver to identify a vertical blanking interval; in the second state, after the step of adjusting the transmitter, signaling that the content will be re-encrypted; and in the second state, transmitting the re-encrypted content in the second format.

According to a still further aspect of the present invention, a set-top device for use within a broadband communications system includes an interface to a digital video signal transmitter operable to use a high-bandwidth digital content protection ("HDCP") system to transmit content to a receiver. The content has a first format in a first state, a second format in a second state, and vertical blanking intervals associated therewith. The apparatus also includes a processor and a computer readable storage medium encoded with a computer program which, when loaded into the processor, is operative to perform a method including: authenticating that the receiver is licensed to receive the content; in the first state, signaling to the receiver, via the interface, that the content will be encrypted; in the first state, transmitting the encrypted content in the first format via the interface; detecting a transition of the content from the first format to the second format; after detecting the transition, continuing to transmit the encrypted content in the first format via the interface; in the second state, signaling to the receiver, via the interface, that the content will be unencrypted; in the second state, adjusting the transmitter to transmit the content in the second format; in the second state, receiving an indication, via the interface, that the receiver identified a vertical blanking interval; in the second state, after the step of adjusting the transmitter, signaling to the receiver, via the interface, that the content will be re-encrypted; and in the second state, transmitting the re-encrypted content in the second format via the interface.

The set-top device may be a cable set-top device or a terrestrial set-top device; the broadband communications system may be a cable television system; the receiver may be a television monitor, a computer monitor, or a projector; the interface to the digital video signal transmitter may be defined by the Digital Display Working Group specification entitled Digital Visual Interface, Revision 1.0; and the HDCP system may be defined by the Digital Content Protection LLC specification entitled High-bandwidth Digital Content Protection System, Revision 1.0. The first format and the second format may be high definition television formats or CCI statuses. The high definition television formats may have refresh rates of 60 Hz or 30 Hz.

DETAILED DESCRIPTION

Figure 1:
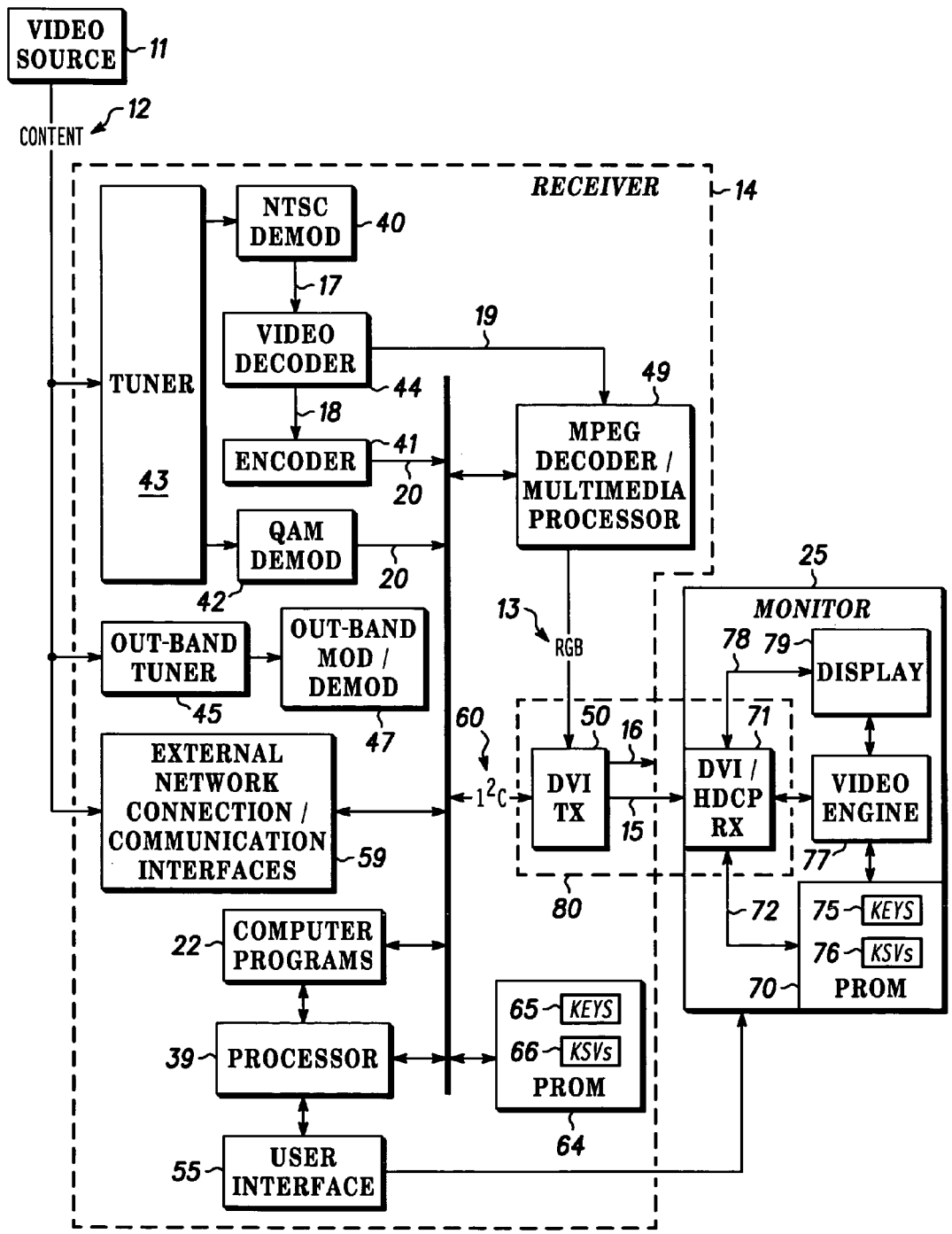
FIG. 1 is a block diagram of a video signal handling system, with which various aspects of the present invention may be used.

Turning now to the drawings, where like numerals designate like components, FIG. 1 is a block diagram of a video handling system 10, which includes a video source 11 for the delivery of content 12 to a consumer receiver device 14. Consumer receiver device 14 arranges for the delivery of a digital video signal 16 to a consumer monitor device 25, over a digital interface 15. Video delivery and protection system 80 includes digital interface 15, and one or more elements (discussed further below) of consumer receiver device 14 and consumer monitor device 25.

As shown, consumer receiver device 14 is a cable set-top box (for example, Motorola's DCT-5100™ set-top box); video source 11 is a hybrid fiber-optic/coax cable network operated by a multiple service operator ("MSO"); content 12 is a programming source supplied by the MSO; digital video signal 16 is a digital red-green-blue ("RBG") representation of content 12 transmitted over digital interface 15; digital interface 15 is a digital visual interface ("DVI") defined by a document published by the Digital Display Working Group ("DDWG") entitled Digital Visual Interface, Revision 1.0 (the "DVI Specification"), which protects digital video signal 16 from copying via the High-bandwidth Digital Content Protection system (the "HDCP System") developed by Digital Content Protection, LLC and described in the document entitled High-bandwidth Digital Content Protection System, Revision 1.0; and consumer monitor device 25 is any type of television monitor, computer monitor, or projector.

Consumer receiver device 14, however, may be any device or combination of devices capable of receiving and/or rendering content 12 to consumer monitor device 25, including but not limited to a terrestrial set-top box, a digital video cassette recorder ("VCR"), a digital video disk ("DVD") player, a computer, or any other consumer appliance responsive to a DVI transmitter device 50 (discussed further below). Video source II may be any public or private, wired or wireless, existing or future video transmission infrastructure or technology operated by any type of program provider, including but not limited to a fiber-optic network, a coaxial cable network, a hybrid network, a satellite network, a cellular network, the Internet, a television network, a radio network, or a copper wire network. Content 12 may be any pre-recorded or live analog or digital electronic signal representing an image and/or audio, in any format.

Consumer receiver device 14 includes external network connection/communication interfaces 59, which support devices such as modems, streaming media players and other network connection support devices and/or software, coupled through local or wide area networks (not shown) to program providers and providers of other content.

Consumer receiver device 14 further includes an in-band tuner 43, which tunes to a channel signal selected by a consumer (not shown) via user interface 55. User interface 55 may be any type of known or future device or technology, such as a remote control, mouse, microphone, keyboard, or display.

Out-of-band tuner 45 is operative to tune to an out-of-band channel signal, such as a control channel signal. Out-of-band modulator/demodulator 47, which includes well-known components operating in well-known manners, is responsive to out-of-band tune 43.

NTSC Demodulator 40 and QAM Demodulator 42 are responsive to in-band tuner 43. NTSC Demodulator 40 includes components responsive to receive analog versions of a channel signal, and to output video information 17, which includes video and/or audio data arranged for formatting in accordance with a predetermined media format.

QAM Demodulator 42, which may be any type of digital demodulator device, such as an ATSC demodulation device, includes components responsive to receive digital versions of a channel signal, and to output video information 20. QAM demodulator 42 component receives and processes digital data packets from one or more digital sources, such as a digital television signal, a Moving Pictures Experts' Group (MPEG) transport stream, or a media stream from external network connection 59, such as a cable modem, using well-known methods and techniques.

Video decoder 44 is responsive to receive and decode video information 17, creating a digital representation of the video information 17, which is output as video information 18 and 19. Video information 18 that may require format translation or modification for compatibility with capabilities of the storage medium 64 may be passed to encoder 41 for formatting. Video information 19 that is in a format preferred for use by MPEG Decoder/Multi Media Processor 49 may be passed directly to MPEG Decoder/Multi Media Processor 49.

Encoder 41 is operative to perform predetermined coding techniques (for example, MPEG-2, MPEG-4, and others) to produce encoded video signal 20 for transmission to MPEG Decoder/Multi Media Processor 49, or for storage in storage medium 64.

MPEG Decoder/Multi-Media Processor 49 is operative to perform predetermined coding techniques to arrange video information 19 and video information 20 into formats displayable by consumer monitor device 25. Specifically, MPEG Decoder/Multi-Media Processor 49 is responsive to: receive and decode video information 19 and video information 20 (analog video programs are preferably passed to MPEG Decoder/Multi Media Processor 49 via video information 19 and digital video programs are preferably passed to MPEG Decoder/Multi Media Processor 49 via video information 20, originating from QAM demodulator 42); scale the received video into the preferred format of either the user and/or the display device (as an example, scale content received as 720×480i to 1280×720p); format the received video information into its red-green-blue ("RGB") components; and transmit RGB signal 13 to DVI/HDCP transmitter 50 (discussed further below). Internal arrangements of MPEG Decoder/Multi-Media Processor 49 are well known, and may include analog-to-digital converters, one or more storage media and/or buffers, and general or special-purpose processors or application-specific integrated circuits, along with demultiplexors for demultiplexing and/or synchronizing at least two transport streams, for example, video and audio. Video and audio decoders and/or analog and digital decoders may be separate, with communication between separate decoders allowing for synchronization, error correction and control. It should also be noted that MPEG Decoder/Multi-Media Processor 49 could have a DVI/HDCP transmitter embedded internally within the device and as such RGB signal 13 would be processed internally within the MPEG Decoder/Multi-Media Processor 49.

Storage medium 64 may be any local or remote device, now known or later developed, capable of recording or storing data, including but not limited to a hard disk drive, a video-cassette recorder tape, all types of compact disks and digital videodisks, a magnetic tape, a home router, or a server. Storage medium 64 may also be, or may include, a programmable read only memory ("PROM"), that holds secret keys 65 (discussed further below, in connection with FIG. 2) and key selection vectors 66 ("KSVs") (also discussed further below, in connection with FIG. 2) required by the HDCP Specification and used by the HDCP System implemented by video delivery and protection system 80 (also discussed further below, in connection with FIG. 2) for transmission/protection of digital video signal 16. It should also be noted that secret keys 65 and key selection vectors 66 may be embedded within the DVI/HDCP transmitter (discussed further below).

DVI/HDCP transmitter 50 is responsive, via $I^2C$ bus 60, to access elements and functions of consumer receiver device 14, such as storage medium 64, processor 39 and computer programs 22, and is responsive to consumer monitor device 25 via digital interface 15. Among other things, DVI/HDCP transmitter 50 arranges for the protection of digital video signal 16, which may have variable formats, during transmission across digital interface 15, by authenticating, and maintaining authentication of, consumer monitor device 25, and encrypting digital video signal 16, all in accordance with requirements of the HDCP Specification and aspects of the present invention. DVI/HDCP transmitter 50 has a physical and logical architecture as set forth in the DVI Specification and/or the HDCP Specification, and may be part of, or separate from, consumer transmitter device 10. DVI/HDCP transmitter 50 may also be incorporated into MPEG Decoder/Multi Media Processor 49.

Consumer monitor device 25, which may also include speakers for outputting audio signals, displays digital video programming received from consumer transmitter device 10 via digital video signal 16 over digital interface 15. Consumer monitor device 25 may support one or more digital television formats, such as formats having a 60 Hz refresh rates, 24 Hz refresh rates, or 30 Hz refresh rates. Types of digital video signals may specify different timing parameters/formats, and the digital television parameters/formats referred to herein are set forth for purposes of example, and not limitation.

Functional arrangements of certain components of consumer monitor device 25 are depicted—DVI/HDCP receiver 71 (discussed further below, in connection with FIG. 2), $I^2C$ bus 72, storage medium 70, video engine 77, and display element 79—that pertain to the receipt and rendering of HDCP-protected digital video signal 16 by consumer monitor device 25. DVI/HDCP receiver 71 has a physical and logical architecture as set forth in the DDWG Specification and/or the HDCP Specification, and is responsive to DVI/HDCP transmitter 50 over digital interface 15. Video engine 77 represents a processor, computer programs and/or physical components operative to implement the functions of consumer monitor device 25. Storage medium 70 may be any local or remote device, now known or later developed, capable of recording or storing data, and in particular may be, or may include, a programmable read only memory ("PROM"), that holds secret keys 75 (discussed further below, in connection with FIG. 2) and key selection vectors 76 ("KSVs") (also discussed further below, in connection with FIG. 2) required by the HDCP Specification and used by DVI/HDCP receiver 71 for protection/reception of digital video signal 16. It should also be noted that secret keys 75 and key selection vectors 76 may be embedded within a DVI/HDCP receiver.

Figure 2:
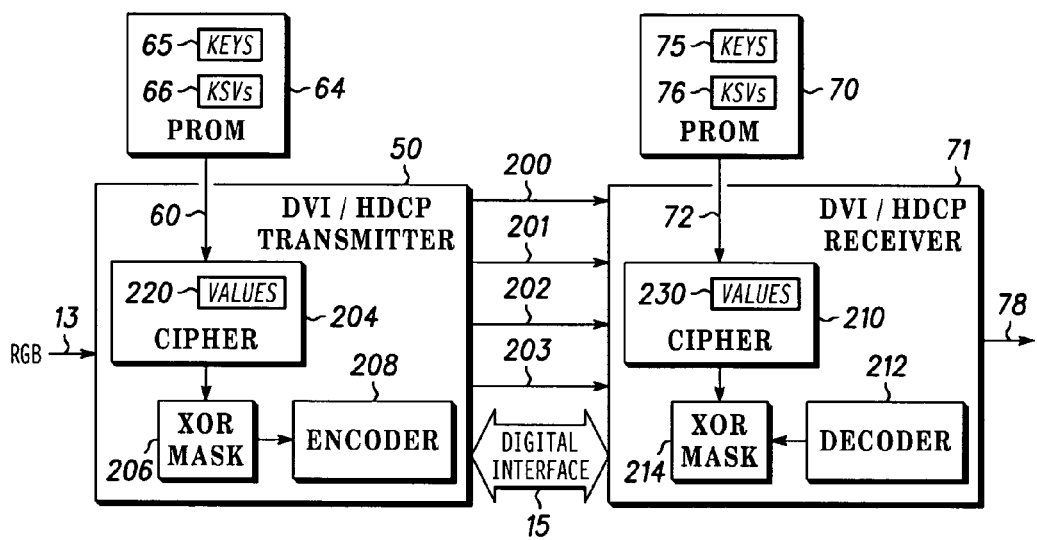
FIG. 2 is a functional block diagram of the video delivery and protection system depicted in FIG. 1, with which various aspects of the present invention may be used.

Display 79 may be any type of display element, such as a cathode ray tube ("CRT") monitor, a plasma monitor, a flat-panel display, or a liquid crystal display ("LCD") monitor. FIG. 2 is a functional block diagram of certain elements of video delivery and protection system 80, which protects digital video signal 16 from copying and other misuse. DVI/HDCP transmitter 50 includes, among other things: a cipher 204 responsive to $I^2C$ bus 60, for creating a pseudo-random data stream on a frame-by-frame basis and for generating certain shared secret values 220 (discussed further below) An, Ki and Ri; an exclusive-or ("XOR") encryption mask 206 for performing a bit-wise XOR of the pseudo-random data stream from cipher 204 with a signal such as signal 13; and an encoder 208 operative to perform predetermined coding techniques to produce digital video signal 16 for transmission DVI/HDCP receiver 71. Elements of DVI/HDCP transmitter 50 may be implemented by, or under control of, processor 39 and/or computer programs 22.

DVI/HDCP receiver 71 includes, among other things, a cipher 210 responsive to $I^2C$ bus 72, for generating certain shared secret values 230 (discussed further below), such as Ki' and Ri'. In addition, in conjunction with decoder 212 and XOR mask 214, cipher 210 is operative to convert digital video signal 16 into signal 78 for display by display element 79. Elements of DVI/HDCP receiver 71 may be implemented by, or under control of, software and/or processor(s) within video engine 77.

Digital interface 15 connects DVI/HDCP transmitter 50 with DVI/HDCP receiver 71. In a Single Link TMDS configuration, three parallel data lines, channel 0 200, channel 1 201, and channel 2 202 carry serialized RGB video data. Control channel 203, which manages clock and control signals, is also shown. A Dual Link TMDS configuration contains an additional set of three parallel data lines. Aspects of the present invention described herein are the same regardless of whether a Single Link or Dual Link TMDS configuration is used.

PROMs 64 and 70 (or other PROMs accessible via $I^2C$ buses 60, 72) store device key sets 65/66 and 75/76 for DVI/HDCP transmitter 50 and DVI/HDCP receiver, respectively. Each device key set is provided by Digital Content Protection LLC, and includes a set of device private keys 65, 75, which is a set of 40 different 56-bit values, and a unique key selection vector 66, 76. Key selection vectors 66, 76 are unique to DVI/HDCP transmitter 50 and DVI/HDCP receiver 71, respectively. It should be noted that PROMs 64 and 70 may be included within their respective DVI/HDCP devices.

Device key sets 65/66, 75/76 and/or shared secret values 220, 230 that are generated by/exchanged between DVI/HDCP transmitter 50 and DVI/HDCP receiver 71, respectively, are communicated over $I^2C$ buses 60, 72.

In accordance with the HDCP Specification, there are three key operational elements of video delivery and protection system 80: (i) an authentication protocol, through which HVI/HDCP transmitter 50 verifies that DVI/HDCP receiver 71 is licensed to receive digital video signal 16; (ii) the transmission of encrypted digital video signal 16 between DVI/HDCP transmitter 50 and DVI/HDCP receiver 71 based on shared secrets established during the authentication protocol; and (iii) a renewability feature, which allows DVI/HDCP transmitter 50 to identify compromised receiver devices and prevent the transmission of digital video signal 16 to the compromised devices.

The authentication protocol, which has three parts, is an exchange between DVI/HDCP transmitter 50 and DVI/HDCP receiver 71 that may begin upon the occurrence of a variety of events, such as hot plug detection of DVI/HDCP receiver 71, completion of certain phases of the operating system of DVI/HDCP transmitter 50, software request, loss of previous authentication of DVI/HDCP receiver 71, or other events. The authentication protocol may also be initiated by DVI/HDCP transmitter 50 at any time.

The first part of the authentication protocol is performed prior to the onset of transmission of digital video signal 16, when it is determined whether device key set 75/76 associated with DVI/HDCP receiver 71 is valid, and, if so, initial shared secret values 220 and 230 are established between DVI/HDCP transmitter 50 and DVI/HDCP receiver 71, respectively.

The second (optional) part of the authentication protocol (not discussed further herein) relates to allowing a repeater device to report key selection vectors of attached DVI/HDCP receivers.

The third part of the authentication protocol involves encryption status signaling. One element of encryption status signaling involves the assertion by DVI/HDCP transmitter 50 of an "encryption enabled" (ENC_EN) or an "encryption disabled" (ENC_DIS) status to DVI/HDCP receiver 71, indicating that all of the data until the next encryption status signaling will either be encrypted/decrypted using certain shared secret values Ki/Ki' (discussed further below), or that all of the data until the next encryption status signaling will be unencrypted.

A second element of encryption status signaling involves providing an initialization state for encrypting digital video signal 16 for each frame, using shared secret values 220 and 230 Ki and Ki'. Specifically, during vertical blanking intervals preceding each transmitted frame of digital video signal 16 for which encryption is enabled, 56-bit values Ki and Ki' are generated by DVI/HDCP transmitter 50 and DVI/HDCP receiver 71, respectively, and used, along with other values, to initialize cipher 204 and 210 for encryption and decryption, respectively, of digital video signal 16. Index i represents the frame number, starting with a value of one for the first frame for which encryption is enabled after completion of the first part of the authentication protocol.

A third element of encryption status signaling involves periodically updating certain shared secret values 220 and 230, specifically 16-bit values Ri and Ri', which are generated and/or used by DVI/HDCP transmitter 50 and DVI/HDCP receiver 71, respectively, to verify the ongoing integrity of digital interface 15. Ri is generated by DVI/HDCP transmitter 50 at least every two seconds. Ri' is generated by DVI/HDCP receiver 71 during the vertical blanking interval preceding every $128^{th}$ frame, and transmitted to DVI/HDCP transmitter 50. During vertical blanking intervals between frames, DVI/HDCP transmitter 50 compares Ri to Ri' received from DVI/HDCP receiver 71.). If the values of Ri and Ri' are equal, DVI/HDCP transmitter 50 enables data encryption and continues to transmit digital video signal 16 to DVI/HDCP receiver 71. Failure of the value of Ri' to be verified against the value of Ri for any reason causes DVI/HDCP transmitter 50 to consider DVI/HDCP receiver 71 to be unauthenticated, and snow may appear on display 79 (shown in FIG. 1) of consumer monitor device 25 (also shown in FIG. 1 "Snow" is the video image displayed by consumer monitor device 25 resulting from the device's inability to properly decrypt the RGB video data, and thus displaying the masked RGB data, which is no longer a proper representation of the original RGB video image.

Loss of authenticated communication between DVI/HDCP transmitter 50 and DVI/HDCP receiver 71 may occur in the HDCP System described in the HDCP Specification when the format of digital video signal 16 changes, because different formats may have different frame refresh rates and/or vertical blanking interval timings. When a new format has a slower refresh/vertical blanking interval rate that the original format, for example, the value of Ri' may not be computed in a timely manner (for example, the rate of return of Ri' may be slower than every two seconds), or the value of Ri' may not correspond correctly with the value of Ri. Even prior to authenticated communication being terminated by DVI/HDCP transmitter 50, loss of synchronization between frames resulting from different refresh rates of different formats may cause DVI/HDCP receiver 71 to be unable to decrypt digital video signal 16 using the value of Ki' it possesses, resulting in a longer period of snow being displayed.

Figure 3:
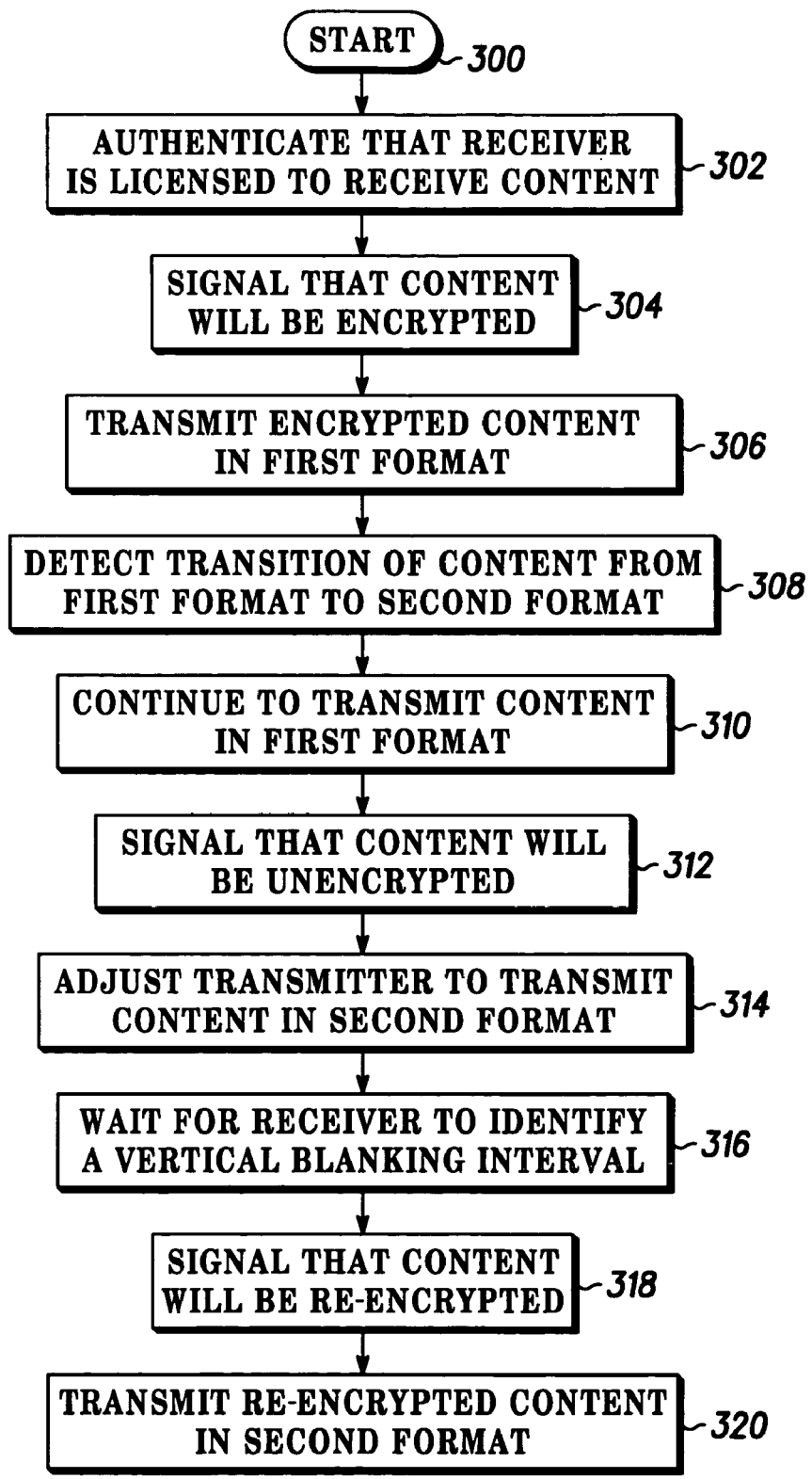
FIG. 3 is a flowchart of a method for transmitting content to a receiver using the video delivery and protection system depicted in FIGS. 1 and 2, in accordance with certain aspects of the present invention.

With continuing reference to FIGS. 1 and 2, FIG. 3 is a flowchart of a method for transmitting content, such as content 12, to a receiver, such as consumer monitor device 25, using a video delivery and protection system, such as system 80, in accordance with aspects of the present invention. In a first state, the content has a first format, and in a second state, the content has a second format, and the content has vertical blanking intervals associated therewith. As an example of format types, the first format may be high definition (HD) such as 1280×720p and the second format may be enhanced definition (ED) such as 720×480p.

The method begins at block 300, and continues at block 302, where it is authenticated that the receiver is licensed to receive the content. DVI/HDCP transmitter 50 may execute the first part of the authentication protocol in accordance with the HDCP Specification, by determining whether device key set 65/66 associated with DVI/HDCP transmitter 50 and device key set 75/76 are both valid.

Next, at block 304, it is signaled that the content will be encrypted. DVI/HDCP transmitter 50 may assert ENC_EN to DVI/HDCP receiver 71, indicating that all of the data until the next encryption status signaling (i.e., next frame) will be encrypted.

At block 306, the encrypted content is transmitted, from DVI/HDCP transmitter 50 to DVI/HDCP receiver 71, in the first format. A transition of the content from the first format to the second format is detected at block 308, and the encrypted content continues to be transmitted in the first format after detecting the transition, at block 310.

The format transition occurs when the video input signal 19 or 20 changes format based on format of the content the user desires to view (as an example, the user is watching a program that is transmitted to the consumer receiver device 14 as 1280×720p and the user changes programs where the new program is transmitted to the consumer receiver device 14 as 720×480p.

At block 312, it is signaled that the content will be unencrypted (for example, DVI/HDCP transmitter 50 may assert ENC_DIS to DVI/HDCP receiver 71, indicating that all of the data until the next encryption status signaling will be unencrypted). The transmitter is then adjusted to transmit content in the second format, at block 314. After adjusting the transmitter, block 316 includes the step of waiting for the receiver to identify a vertical blanking interval. It is signaled, at block 318, that the content will be re-encrypted (for example, DVI/HDCP transmitter 50 may assert ENC_EN to DVI/HDCP receiver 71), and at block 320, the re-encrypted content is transmitted in the second format.

The identified vertical blanking interval may be associated with a refresh rate of the first format and/or the second format. In the latter case, the identification of the vertical blanking interval at block 316 may occur after the step at block 314 of adjusting the transmitter to transmit content in the second format. In the former case, the step at block 316 of waiting for identification of the vertical blanking interval occurs after the detection of the transition of the content from the first format to the second format at block 308, but precedes the step of signaling that the content will be unencrypted, at block 312. For example, the comparison of shared secret values Ri and Ri' may be used to verify that authentication is still valid, prior to disabling encryption at block 312.

Figure 4:
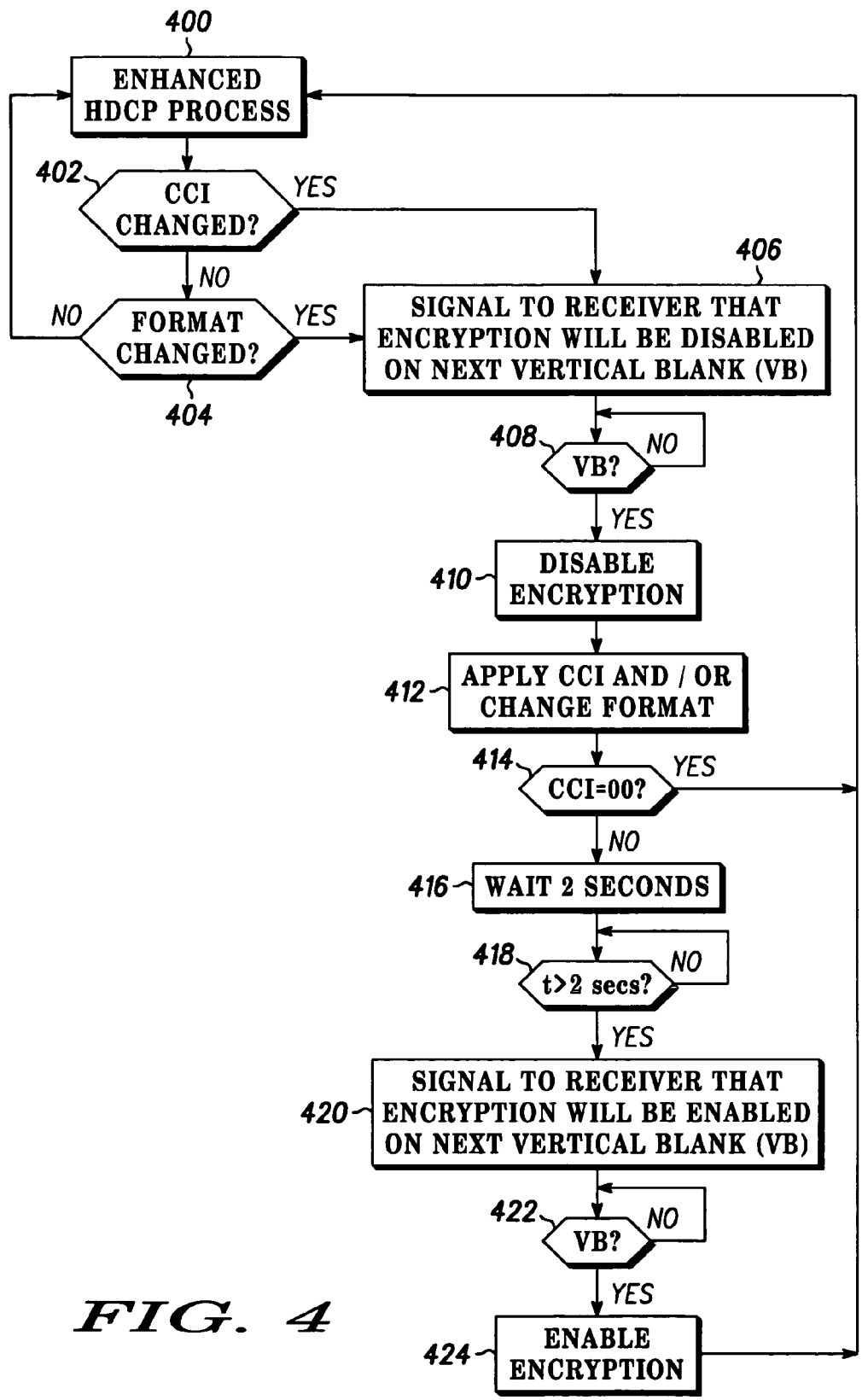
FIG. 4 is a flowchart of a method for transmitting content to a receiver using the video delivery and protection system depicted in FIGS. 1 and 2, in accordance with further aspects of the present invention.

FIG. 4 is a flowchart detailing, in a first exemplary arrangement in accordance with further aspects of the present invention, how certain steps represented in blocks 306-320 of FIG. 3 may be implemented (by DVI/HDCP transmitter 50 or another element or combination of elements of consumer receiver device 14) to transmit content, such as content 12, to a receiver, such as consumer monitor device 25, using a video delivery and protection system, such as system 80. The flowchart begins at block 400, where it is assumed that: (i) a DVI/HDCP transmitter, such as DVI/HDCP transmitter 50, has authorized (using initial authorization procedures provided in the HDCP Specification) a DVI/HDCP receiver, such as DVI/HDCP receiver 71, to receive encrypted content in a certain format; and (ii) the DVI/HDCP transmitter is transmitting such encrypted content in the certain format to the DVI/HDCP receiver in accordance with procedures provided in the HDCP Specification. The method continues at diamonds 402 and 404, where it is determined whether either the copy control information ("CCI") flag in the transmitted content has changed settings (for example, between settings of copy free, copy once, copy no more, and copy never), or the format of the content has changed (for example, from a format having a 60 Hz refresh rate to a format having another refresh rate), respectively.

If it is determined that there has been a change in either the CCI flag or the content format, then, at block 406, DVI/HDCP transmitter 50 signals to DVI/HDCP receiver 71 that encryption will be disabled on the next vertical blanking interval. DVI/HDCP transmitter 50 may continue to transmit encrypted content in the first format until the next vertical blanking interval associated with the first format is reached. Once it is determined, at diamond 408, that the next vertical blanking interval has occurred, encryption is disabled at block 410, for example by the assertion of ENC_DIS by DVI/HDCP transmitter 50 to DVI/HDCP receiver 71.

Next, at block 412, the new CCI and/or format change is implemented, and unless it is determined at diamond 414 that, the method waits for at least about two seconds as provided in block 416 and diamond 418. Approximately two seconds allows DVI/HDCP receiver 71 sufficient time to identify timing parameters associated with the new format, such as a vertical blanking interval and/or refresh rate, and would allow DVI/HDCP transmitter 50 to verify receipt of the receiver's identification of the timing parameter(s).

At block 420, DVI/HDCP transmitter 50 signals to DVI/HDCP receiver 71 that encryption will be re-enabled on the next vertical blanking interval. When, at diamond 422, the next vertical blanking interval is identified, encryption is re-enabled at block 424 for the new format, and the method returns to block 400.

Figure 5:
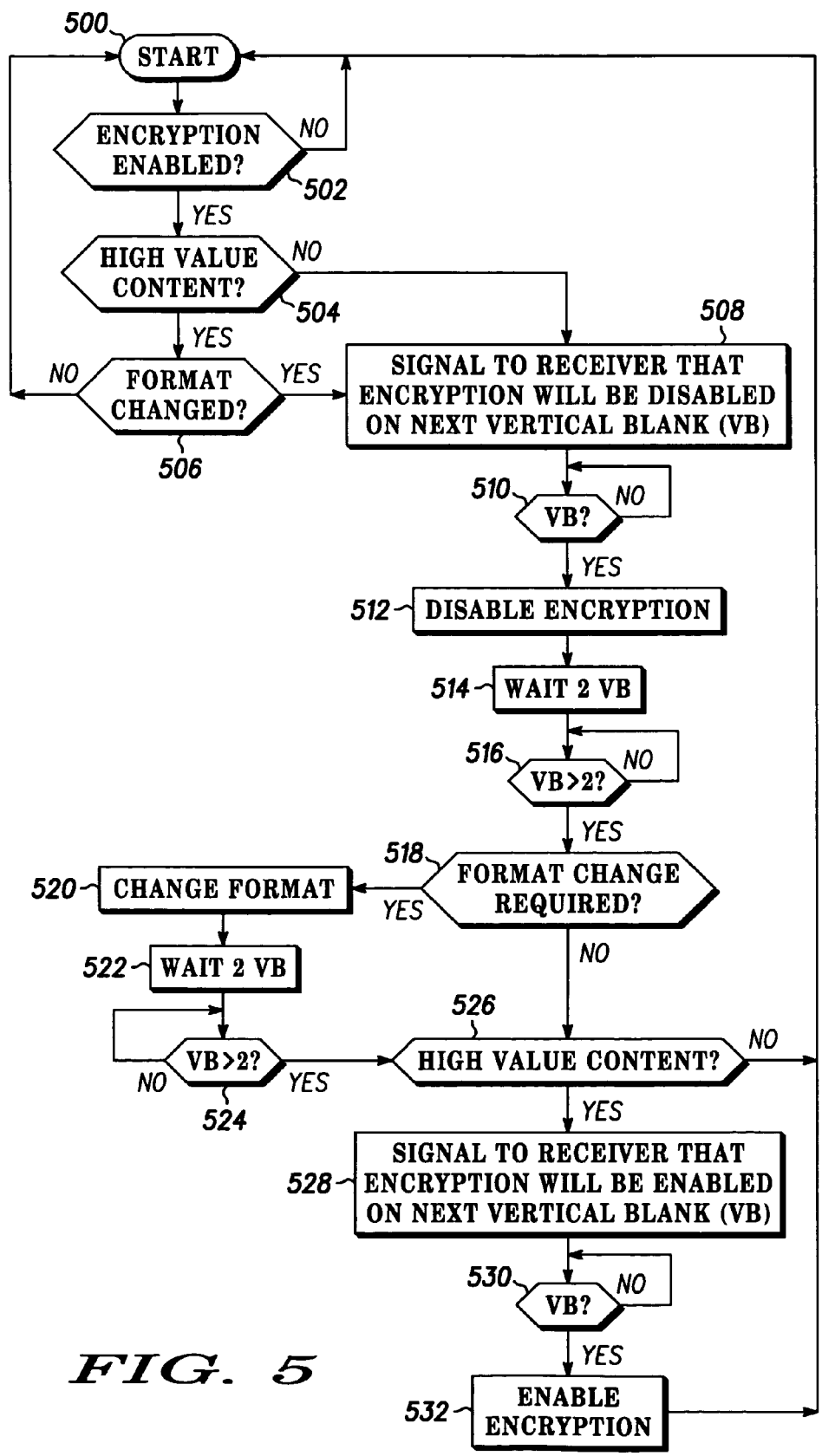
FIG. 5 is a flowchart of a method for transmitting content to a receiver using the video delivery and protection system depicted in FIGS. 1 and 2, in accordance with still further aspects of the present invention.

FIG. 5 is a flowchart detailing, in a second exemplary arrangement in accordance with still further aspects of the present invention, how certain steps represented in blocks 306-320 of FIG. 3 may be implemented (by DVI/HDCP transmitter 50 or another element or combination of elements of consumer receiver device 14) to transmit content, such as content 12, to a receiver, such as consumer monitor device 25, using a video delivery and protection system, such as system 80.

The flowchart begins at block 500, and continues at diamond 502, where it is determined whether a DVI/HDCP transmitter, such as DVI/HDCP transmitter 50, has authorized and enabled a DVI/HDCP receiver, such as DVI/HDCP receiver 71, to receive encrypted content in a certain format. If it is determined that the DVI/HDCP transmitter is transmitting such encrypted content in the certain format to the DVI/HDCP receiver in accordance with procedures provided in the HDCP Specification, then it is determined at diamond 504 whether the content is high-value content. For high-value encrypted content not having a format change, as determined at diamond 506, the method returns to block 500.

If it is determined, at diamond 506, that high-value encrypted content has a format change, then, at block 508, DVI/HDCP transmitter 50 signals to DVI/HDCP receiver 71 that encryption will be disabled on the next vertical blanking interval, as shown in diamond 510 and block 512. After waiting approximately two vertical blanking intervals, as shown at block 514 and diamond 516, it is verified whether a format change is required.

If no format change is required at diamond 518, and the content is not high-value content, as determined at diamond 526, then the method returns to block 500. If no format change is required at diamond 518, and the content is high-value content, as determined at diamond 526, then at block 528, DVI/HDCP transmitter 50 signals to DVI/HDCP receiver 71 that encryption will be enabled on the next vertical blanking interval, as shown in diamond 530 and block 532, and the method returns to block 500.

If a format change is required at diamond 518, then at block 520 the format is changed, and after waiting approximately two vertical blanking intervals, as shown at block 522 and diamond 524, the method continues at diamond 526, where it is determined whether the content is high-value content, and proceeds through steps 528, 530, and 532 (as described above), before returning to block 500.

The foregoing methods may be implemented by software, firmware, hardware, or a combination thereof. For example, one or more computer programs, such as computer programs 22, which may be encoded on one or more computer-readable media, such as storage medium 64, and which, when loaded into a processor, such as processor 39, implement the methods. Such computer programs may be implemented according to well-known software engineering practices. It will be understood, however, that aspects of the present invention are not limited to any specific embodiments of computer software or signal processing methods. For example, one or more processors packaged together or separately may implement the functions described herein in a variety of ways. It will also be appreciated that computer programs 22 may be any stored instructions, in one or more parts, that electronically control functions described herein.

Thus, methods and apparatuses for transmitting content to HDCP receivers that allow for content formats to change without disrupting video reception by the HDCP receivers have been described. The methods and apparatuses described herein are compatible with the HDCP Specification, and address the problem of snow appearing on HDCP receivers because of changing video formats, which is not adequately addressed by the HDCP Specification. Fewer disruptions in video reception may increase consumers' satisfaction with the performance of their source devices, display devices, and/or content providers.

Although specific functional elements and arrangements thereof have been described herein, it is contemplated that the systems, apparatuses and methods herein may be implemented in a variety of ways. Functional elements may be packaged together or individually, or may be implemented by fewer, more or different devices, and may be either integrated within other products, or adapted to work with other products externally. The terms receiver device and transmitter device are used contextually and for purposes of description, and not limitation, and it will be understood that a particular device may function as both a transmitter and a receiver of certain signals. When one element is indicated as being responsive to another element, the elements may be directly or indirectly coupled. Connections depicted herein may be logical or physical in practice to achieve a coupling or communicative interface between elements. Connections may be implemented as inter-process communications among software processes.

It will furthermore be apparent that other and further forms of the invention, and embodiments other than the specific embodiments described above, may be devised without departing from the spirit and scope of the appended claims and their equivalents, and it is therefore intended that the scope of this invention will only be governed by the following claims and their equivalents.

The invention claimed is:

1. A method for transmitting first and second content to a receiver via a digital video interface, the first content having a first format, the second content having a second format, and the first and second content having a plurality of vertical blanking intervals, the method comprising:
   authenticating that the receiver is authorized to receive the content from a transmitter;
   transmitting the first content as first encrypted content in the first format;
   detecting a request to transition from the first content to the second content;
   signaling that the first content will be transmitted unencrypted after a next vertical blanking interval associated with the first format;
   responsive to detecting the request to transition, transmitting the first content unencrypted after the next vertical blanking interval associated with the first format;
   adjusting the transmitter to transmit the second content in the second format;
   waiting for the receiver to identify a vertical blanking interval;
   after the adjusting the transmitter, signaling that the second content will be encrypted after another next vertical blanking interval associated with the second format; and
   transmitting the encrypted second content in the second format after the another next vertical blanking interval associated with the second format,
   wherein the receiver receives content without loss of authenticated communication caused by differing attributes of the first format and the second format in changing from the first format to the second format.

2. The method according to claim 1, further comprising:
after the adjusting the transmitter, waiting a predetermined period of time.

3. The method according to claim 1, wherein the signaling that the first content will be unencrypted occurs during a first vertical blanking interval after detecting the transition, the first vertical blanking interval associated with the first format.

4. The method according to claim 1, wherein the detecting the request to transition from the first format to the second format comprises detecting a change of a copy control information ("CCI") flag.

5. The method according to claim 1, wherein the first format and the second format are selected from the group consisting of: high definition television formats; and CCI statuses.

6. The method according to claim 2, wherein the waiting a predetermined period of time comprises waiting at least about two seconds.

7. The method according to claim 2, wherein the waiting for the receiver to identify the vertical blanking interval further comprises:
receiving an indication that the receiver identified a vertical blanking interval; and
verifying receipt of the indication that the receiver identified the vertical blanking interval.

8. The method according to claim 7, wherein the identified vertical blanking interval is associated with the first format.

9. The method according to claim 7, wherein the identified vertical blanking interval is associated with the second format.

10. The method according to claim 8, wherein the verifying receipt of the indication that the receiver identified the vertical blanking interval occurs prior to the signaling that the first content will be unencrypted.

11. The method according to claim 9, wherein the verifying receipt of the indication that the receiver identified the vertical blanking interval occurs after the signaling that the first content will be unencrypted, and after the adjusting the transmitter to transmit the second content in the second format.

12. The method according to claim 3, wherein the signaling that the second content will be encrypted occurs during a first vertical blanking interval associated with the second format.

13. An apparatus for transmitting first and second content to a receiver via a digital video interface, the first content having a first format, the second content having a second format, and the first and second content having vertical blanking intervals, the apparatus comprising:
a computer-readable storage medium that stores a computer program; and
a processor responsive to the computer program so the processor is operative to perform a method comprising:
authenticating that the receiver is authorized to receive the content from a transmitter;
transmitting the first content as first encrypted content in the first format;
detecting a request to transition from the first content to the second content;
signaling that the first content will be transmitted unencrypted after a next vertical blanking interval associated with the first format;
responsive to detecting the request to transition, transmitting the first content unencrypted after the next vertical blanking interval associated with the first format;
adjusting the transmitter to transmit the second content in the second format;
waiting for the receiver to identify a vertical blanking interval;
after the adjusting the transmitter, signaling that the second content will be encrypted after another next vertical blanking interval associated with the second format; and
transmitting the encrypted second content in the second format after the another next vertical blanking interval associated with the second format,
wherein the receiver receives content without loss of authenticated communication caused by differing attributes of the first format and the second format in changing from the first format to the second format.

14. The method according to claim 5, wherein the high definition television formats have refresh rates selected from the group consisting of: 60 Hz and 30 Hz.

* * * * *